US011954546B2

(12) United States Patent
Ando et al.

(10) Patent No.: US 11,954,546 B2
(45) Date of Patent: Apr. 9, 2024

(54) STRUCTURE FOR INDIVIDUAL AUTHENTICATION, METHOD FOR PRODUCING THEREOF, AND INDIVIDUAL AUTHENTICATION METHOD

(71) Applicants: Shin-Etsu Chemical Co., Ltd., Tokyo (JP); TOHOKU UNIVERSITY, Sendai (JP)

(72) Inventors: Masao Ando, Joetsu (JP); Hiroyuki Yamazaki, Joetsu (JP); Masaki Takeuchi, Joetsu (JP); Masaru Nakagawa, Sendai (JP); Shunya Ito, Sendai (JP)

(73) Assignees: SHIN-ETSU CHEMICAL CO., LTD., Tokyo (JP); TOHOKU UNIVERSITY, Sendai (JP)

( * ) Notice: Subject to any disclaimer, the term of this patent is extended or adjusted under 35 U.S.C. 154(b) by 340 days.

(21) Appl. No.: 17/329,832

(22) Filed: May 25, 2021

(65) Prior Publication Data
US 2021/0374495 A1      Dec. 2, 2021

(30) Foreign Application Priority Data

May 26, 2020   (JP) ................. 2020-090993

(51) Int. Cl.
*G06K 19/06*      (2006.01)
*B82Y 35/00*      (2011.01)
*B82Y 40/00*      (2011.01)

(52) U.S. Cl.
CPC ........ *G06K 19/06084* (2013.01); *B82Y 35/00* (2013.01); *B82Y 40/00* (2013.01)

(58) Field of Classification Search
CPC ... G06K 19/06084; B82Y 35/00; B82Y 40/00
USPC ........................................... 235/487
See application file for complete search history.

(56) References Cited

U.S. PATENT DOCUMENTS

| 2006/0023212 A1 | 2/2006 | Nishii et al. |
| 2007/0032877 A1* | 2/2007 | Whiteside ............ A61L 27/303 623/22.15 |
| 2015/0367380 A1* | 12/2015 | Kotov ................ B29C 37/0053 428/206 |

(Continued)

FOREIGN PATENT DOCUMENTS

| JP | 2014-59877 A | 4/2014 |
| JP | 2014-238465 A | 12/2014 |

(Continued)

OTHER PUBLICATIONS

Extended European Search Report for European Application No. 21175554.1, dated Sep. 29, 2021.

(Continued)

*Primary Examiner* — Allyson N Trail
(74) *Attorney, Agent, or Firm* — Birch, Stewart, Kolasch & Birch, LLP

(57) ABSTRACT

Provided is a structure for individual authentication in which a pillar pattern region including a plurality of nanopillars formed of synthetic quartz glass is formed on at least a part of a surface portion of a synthetic quartz glass substrate. In the pillar pattern region, the nanopillars have an indentation elastic modulus of 35 to 100 GPa as measured by a nanoindentation method, and the nanopillars are plastically deformed.

18 Claims, 14 Drawing Sheets

(56) References Cited

U.S. PATENT DOCUMENTS

| | | | |
|---|---|---|---|
| 2021/0087105 A1* | 3/2021 | Bellman | C03C 21/002 |
| 2021/0174984 A1* | 6/2021 | Ichikawa | H01L 24/29 |
| 2021/0292570 A1* | 9/2021 | Frey | C08K 13/06 |
| 2023/0097468 A1* | 3/2023 | Sasaki | C23C 14/505 |
| | | | 428/328 |

FOREIGN PATENT DOCUMENTS

| | | |
|---|---|---|
| JP | 2016-118635 A | 6/2016 |
| WO | WO 2004/027493 A1 | 4/2004 |

OTHER PUBLICATIONS

Xie et al., "Vertical nanopillars for highly localized fluorescence imaging," Proceedings of the National Academy of Sciences, vol. 108, No. 10, 2011, pp. 3894-3899, 6 pages total.
"Quartz Glass Information", Internet Archive, Wayback Machine, Aug. 23, 2018, pp. 1-3, with an English translation.
"Silica Glass", Internet Archive, Wayback Machine, Aug. 10, 2017, pp. 1-5, with an English translation.

\* cited by examiner

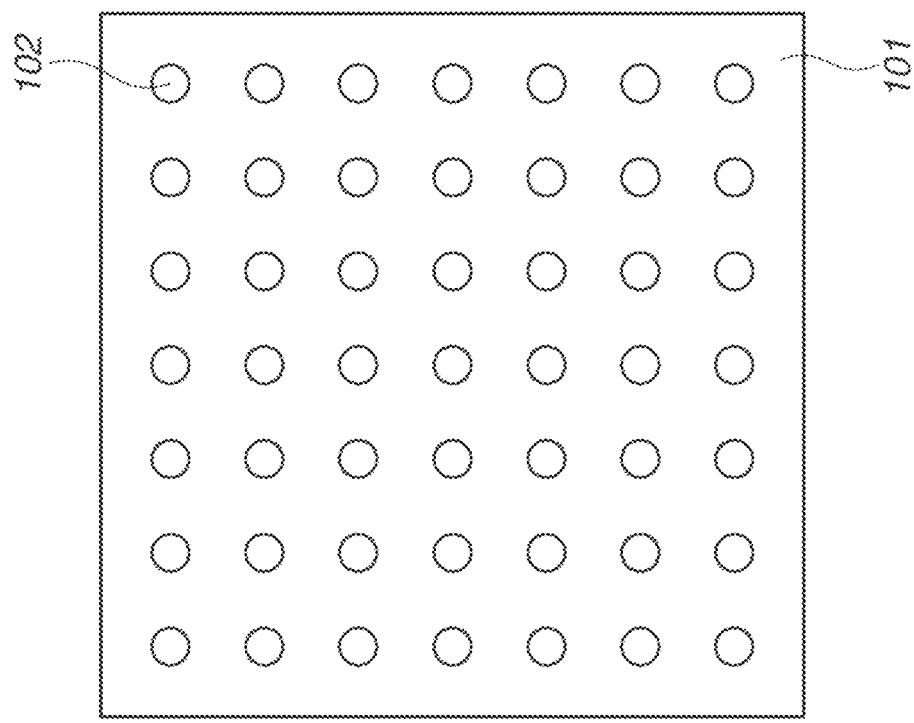

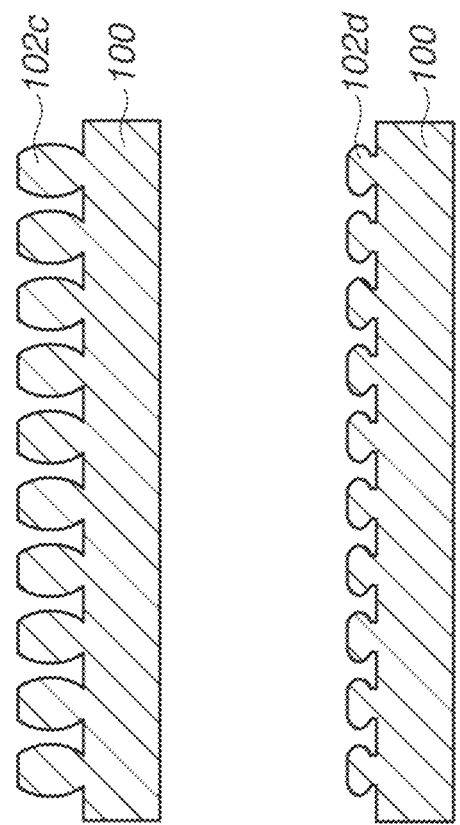

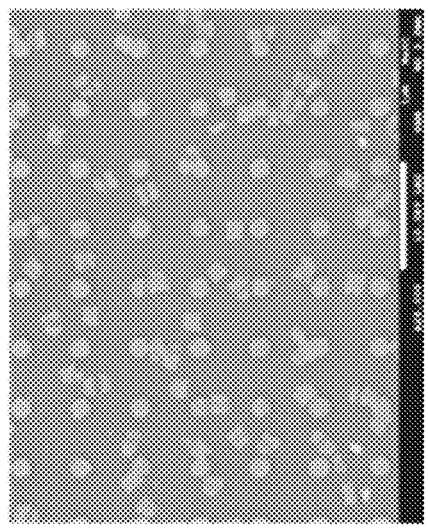
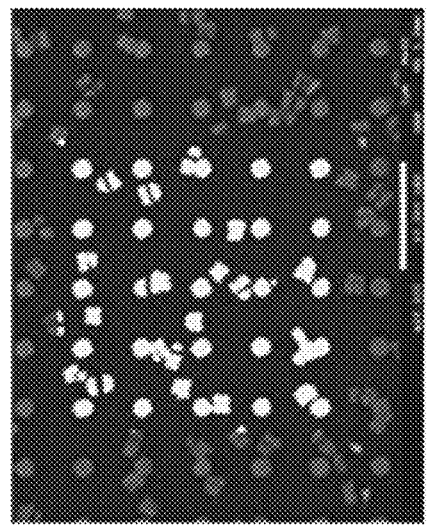
FIG. 14A
FIG. 14B

STRUCTURE FOR INDIVIDUAL AUTHENTICATION, METHOD FOR PRODUCING THEREOF, AND INDIVIDUAL AUTHENTICATION METHOD

CROSS-REFERENCE TO RELATED APPLICATION

This non-provisional application claims priority under 35 U.S.C. § 119(a) on Patent Application No. 2020-090993 filed in Japan on May 26, 2020, the entire contents of which are hereby incorporated by reference.

TECHNICAL FIELD

The present invention relates to a structure for individual authentication which is used for individual authentication in which authentication is performed with the utilization of a unique characteristic formed in an individual that is an artificial object; a method for producing the structure for individual authentication; and an individual authentication method using the structure for individual authentication.

BACKGROUND ART

Biometrics technology for authenticating individual persons with the utilization of biometric information unique to each person has been put into practical use in various technical fields. Biometric information includes physical characteristics such as fingerprints, irises and veins, behavioral characteristics such as voiceprints and handwritings, and the like, and is utilized for authentication of users of smartphones and cash cards, authentication for authorization of login to computers, and the like. In recent years, development of artificial object-metrics technology for authenticating an artificial object having the same unique information as the biometric information by using the unique information has been proceeding.

The artificial object-metrics technology is promising technology as means for improving the safety and the reliability of articles required to be forge-proof, such as certificates and cash cards. Artificial objects used for the artificial object-metrics technology is required to have individuality, reading stability, durability and cloning resistance as physical properties unique to individuals.

For example, a technique has been proposed which utilize as unique information an artificial pattern which is extremely poor in reproducibility, such as a light reflection pattern of a granular material, a magnetic pattern of magnetic fibers, a randomly recorded magnetic pattern, random magnetic pattern of magnetic stripe, a random charge amount pattern of a memory cell, or a resonance pattern of conductive fibers. In addition, JP-A 2014-59377 (Patent Document 1) indicates that clone resistance is developed by a pattern aggregate in a structure for artificial object-metrics which is obtained by forming an active energy ray-sensitive resist coating film on a base, irradiating the coating film with an active energy ray, then performing development treatment to form a pattern, and collapsing a part of the pattern by application of an external force to form the pattern aggregate.

CITATION LIST

Patent Document 1: JP-A 2014-59377

SUMMARY OF INVENTION

However, as artificial objects, many conventional artificial patterns can be utilized as unique information for authentication, but are difficult to form into extremely small chips, and hence difficult to incorporate into IC cards etc. In addition, in the resist structure described in JP-A 2014-59377, deformation of the pattern is limited to three types which are inclination, tilting and slipping, and therefore the clone resistance is not sufficient. Also, degeneration such as deformation, discoloration or degradation may occur due to sunlight, ultraviolet rays and temperature change, weather resistance and long-term stability are not insufficient, and long-term reliability is low. A structure for individual authentication is desired which can be used not only in the global environment but also in the environments of the cosmic space and planets, is excellent in weather resistance and long-term stability, has high long-term reliability, and contributes to artificial metrics technology.

The present invention has been made in view of the above-described circumstances, and an object of the present invention is to provide a structure for individual authentication which is excellent in clone resistance and weather resistance, has high long-term reliability, and includes a fine artificial pattern.

The present inventors have extensively conducted studies for achieving the above-described object, and resultantly found that it is effective for individual authentication with an artificial object that a pillar pattern including plastically deformed nanopillars is utilized for identification with the nanopillars being plastically deformable nanopillars formed of synthetic quartz glass, a pillar pattern region including a plurality of nanopillars formed of synthetic quartz glass is formed on at least a part of the surface portion of a synthetic quartz glass substrate, and a structure for individual authentication with the nanopillars having an indentation elastic modulus is excellent in clone resistance and weather resistance enables individual authentication with high long-term reliability. In this way, the present invention has been attained.

In one aspect, the present invention provides a structure for individual authentication in which a pillar pattern region including a plurality of nanopillars formed of synthetic quartz glass is formed on at least a part of a surface portion of a synthetic quartz glass substrate, wherein
  in the pillar pattern region, the nanopillars have an indentation elastic modulus of 35 to 100 GPa as measured by a nanoindentation method, and
  the nanopillars are plastically deformed.

Preferably, the nanopillars have a height H of 20 to 1,500 nm, a width W of 10 to 500 nm and an aspect ratio (H/W) of 0.5 to 6.

In another aspect, the present invention provides a method for producing the structure for individual authentication, the method including the steps of:
  forming an inorganic film on the surface of the synthetic quartz glass substrate, the surface being for forming the pillar pattern region;
  forming an organic film on the inorganic film;
  patterning the organic film to form an organic film pattern on the inorganic film;
  etching the inorganic film with the organic film pattern as an etching mask to form an inorganic film pattern;
  etching the surface portion of the synthetic quartz glass substrate with the organic film pattern and inorganic film pattern or the inorganic film pattern, as an etching mask, to form the pillar pattern region; and
  removing the organic film pattern and inorganic film pattern or the inorganic film pattern.

In another aspect, the present invention provides a method for producing the structure for individual authentication, the method including the steps of:

forming an organic film on the surface of the synthetic quartz glass substrate, the surface being for forming the pillar pattern region;

patterning the organic film to form an organic film pattern on the surface of the synthetic quartz glass substrate;

forming an inorganic film on the organic film pattern and the exposed surface of the synthetic quartz glass substrate;

removing the organic film pattern together with the inorganic film formed on the organic film pattern;

etching the surface portion of the synthetic quartz glass substrate with the inorganic film pattern, as an etching mask, which is formed from the inorganic film formed on the surface of the synthetic quartz glass substrate, to form the pillar pattern region; and removing the inorganic film pattern.

Preferably, in the step of patterning the organic film to form the organic film pattern, the organic film pattern is formed by electron beam lithography, photolithography or nanoimprint lithography.

In the other aspect, the present invention provides an individual authentication method including vertically pressing at least some of the nanopillars formed in the pillar pattern region of the structure for individual authentication to cause plastic deformation, and identifying a pillar pattern including the deformed nanopillars.

Advantageous Effects of Invention

According to the present invention, a gray scale can be formed on the basis of the type and the degree of deformation of nanopillars, and the mode of the pillar pattern after deformation is substantially infinite, so that by using the structure for individual authentication according to the present invention, individual authentication with an artificial object can be performed with excellent individuality and clone resistance. In addition, in the structure for individual authentication according to the present invention, the synthetic quartz glass typically has an extremely high purity with the metal impurity concentration being 1 ppm or less, and therefore degeneration such as deformation, discoloration or degradation by external environments such as sunlight, ultraviolet rays and a temperature change hardly occurs, so that excellent weather resistance long-term stability and high long-term reliability can be obtained. Further, excellent weather resistance and long-term stability and high long-term reliability can be obtained not only in the global environment but also in the environments of the cosmic space and planets.

BRIEF DESCRIPTION OF DRAWING

FIGS. 1A to 1C show examples in which the pillar pattern region is provided at one, three and five positions, respectively;

FIG. 2 is a plan view showing an embodiment of arrangement of nanopillars formed in a pillar pattern region on a synthetic quartz glass substrate;

FIG. 3A shows cylindrical nanopillars and FIG. 3B shows truncated cone-shaped nanopillars;

FIGS. 4A and 4B are sectional views showing an embodiment of shapes of plastically deformed nanopillars, where FIG. 4A shows barrel-shaped nanopillars and FIG. 4B shows mushroom-shaped nanopillars;

FIG. 5A shows nanopillars having a circular shape in plan view, FIG. 5B shows nanopillars having an elliptic shape in plan view and FIG. 5C is a view showing nanopillars having a circular shape in plan view and having cracks;

FIG. 10A shows the image before plastic deformation, FIG. 10B shows the image after plastic deformation, and FIG. 10C shows an image obtained by image conversion (binarization) of the image of FIG. 10B;

FIG. 12A shows a top image before plastic deformation, FIG. 12B shows a cross-section profile before plastic deformation, FIG. 12C shows a top image after plastic deformation, and FIG. 12D shows a cross-section profile after plastic deformation;

FIGS. 14A and 14B show scanning electron microscope images of an upper surface of portions of plastically deformed nanopillars in pillar pattern regions of the structure for individual authentication in Experiment Example 1, where FIG. 14B shows an image obtained by image conversion (binarization) of the image of FIG. 14A.

DESCRIPTION OF THE PREFERRED EMBODIMENT

Figure 1A:
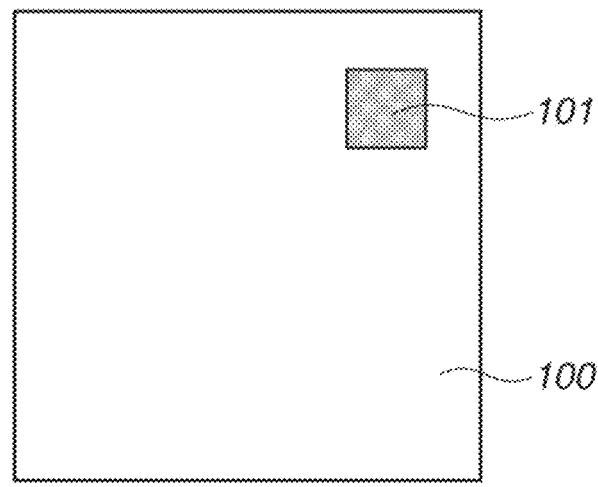
FIGS. 1A to 1C are plan views showing an embodiment of arrangement of pillar pattern regions on a synthetic quartz glass substrate.

Hereinafter, embodiments of the present invention will be described with reference to the drawings, but the drawings are schematic or conceptual, and the dimensions of members, the relative sizes of members, the ratios between members, and the like do not necessarily represent the realities. In addition, even for the same member etc., the dimension or the ratio may vary between drawings.

In the structure for individual authentication according to the present invention, a pillar pattern region including a plurality of nanopillars formed of synthetic quartz glass is formed on at least a part of the surface portion of a synthetic quartz glass substrate.

The synthetic quartz glass substrate for use in the present invention may be one obtained in the following manner: a synthetic quartz glass ingot produced by reacting a silica raw material compound such as a silane compound or a siloxane compound with an oxyhydrogen flame is molded into a desired shape, subjected to annealing treatment, sliced to a desired thickness, and then wrapped, the outer periphery is polished if necessary, and rough polishing and precision polishing are performed.

The shape of the synthetic quartz glass substrate may be a quadrangular shape such as a rectangle, a circular shape, or the like from the viewpoint of ease of production. For example, for a quadrangular substrate, a substrate with a side length of 10 to 300 mm is suitably used, and for a circular glass substrate, a substrate with a diameter of 10 to 300 mm is suitably used. The thickness of the synthetic quartz glass substrate is appropriately selected, and is preferably 10 μm or more, more preferably 50 μm or more, still more preferably 100 μm or more, and preferably 300 mm or less, more preferably 100 mm or less, still more preferably 30 mm or less. For the synthetic quartz glass substrate with the above-described size in which a structure for individual authentication is formed on a part of the surface portion of a substrate, a pillar pattern region including a plurality of nanopillars formed of synthetic quartz glass is formed on a quadrangular substrate, e.g. a substrate with a side length of 1 to 10 mm and a thickness of 1 mm or less, or a circular glass substrate, e.g. a substrate with a diameter of 1 to 10 mm and a thickness of 1 mm or less, and dicing is then performed to the above-described size or a smaller size. The shape of the synthetic quartz glass substrate to be processed is determined with consideration given to a dicing method which is mechanical cutting, laser cutting or the like. In addition, the shape of the synthetic quartz glass substrate is determined with consideration given to ease of handling in attachment of the structure for individual authentication to another member for identification.

The shape of the pillar pattern region present on at least a part of the surface portion of the substrate depends on a measurement method for performing authentication and a detection resolution. When an electron microscope is used for measurement, it is preferable that the pillar pattern region has a square shape with a side length of, for example, 1 to 100 μm, or a circular shape with a diameter of, for example, 1 to 100 μm, depending on an imaging magnification. If the length or diameter of one side is less than 1 μm, the number of nanopillars in the structure for individual authentication may decrease, leading to reduction in individuality and clone resistance. If the side length or diameter is more than 100 μm, there is the possibility of being visually recognized, and the position at which the structure for individual authentication may be easily identified. When an atomic force microscope is used for measurement, it is preferable that the pillar pattern region has a square shape with a side length of, for example, 1 to 100 μm, or a circular shape with a diameter of, for example, 1 to 100 μm, depending on an area scannable by a scanner. When an optical microscope is used for measurement, it is preferable that the pillar pattern region has a square shape with a side length of, for example, 10 μm to 2 mm, or a circular shape with a diameter of, for example, 10 μm to 2 mm, depending on an imaging magnification.

The nanopillar is a microstructure formed of synthetic quartz glass and shaped to protrude from the base portion of the synthetic quartz glass substrate. The pillar pattern region includes a plurality of nanopillars, and the individual nanopillars are arranged so as to be separated from other nanopillars. The nanopillar is usually formed integrally with another portion (base portion) of the synthetic quartz glass substrate.

Figure 1B:
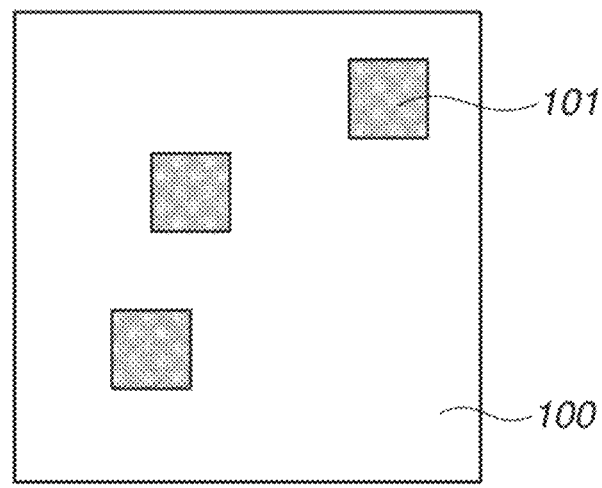
Figure 1C:
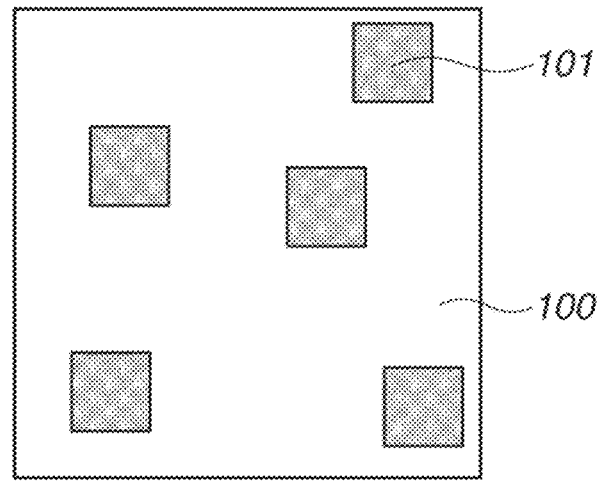

FIGS. 1A to 1C are plan views showing an embodiment of arrangement of pillar pattern regions on a synthetic quartz glass substrate, and in FIGS. 1A to 1C, a pillar pattern region 101 is provided at one, three and five positions, respectively, on a synthetic quartz glass substrate 100. The pillar pattern region may be provided at least at one position or at a plurality of positions on the synthetic quartz glass substrate. The shape of the pillar pattern region is not particularly limited, and examples thereof include a circular shape, an elliptic shape, a square shape, a rectangular shape, a trapezoidal shape and a triangular shape. The shape of the pillar pattern region may be an irregular shape which is not classified as any of the above-mentioned shapes, or a plurality of types of shapes may be combined.

FIG. 2 is a plan view showing an embodiment of arrangement of nanopillars formed in the pillar pattern region of the synthetic quartz glass substrate. Here, nanopillars 102 are arranged in a square lattice pattern in the pillar pattern region 101. The arrangement of the nanopillars formed in the pillar pattern region is not particularly limited, and may be a regular arrangement with the pillars arranged at regular intervals, or a random arrangement. Examples of the regular arrangement include an orthorhombic lattice shape, a rectangular lattice shape, a face-centered rectangular lattice shape, a hexagonal lattice shape and a square lattice shape. In the regular arrangement, the period is not particularly limited, and is preferably 20 nm or more, more preferably 30 nm or more, and preferably 1,500 nm or less, more preferably 1,000 nm or less.

Figure 3A:
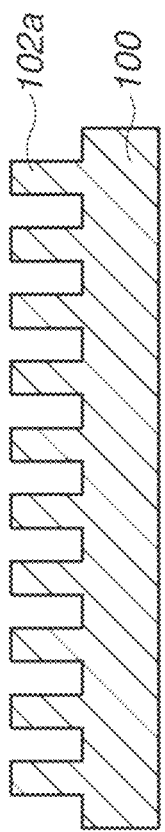
FIGS. 3A and 3B are sectional views showing an embodiment of shapes of nanopillars, where
Figure 3B:
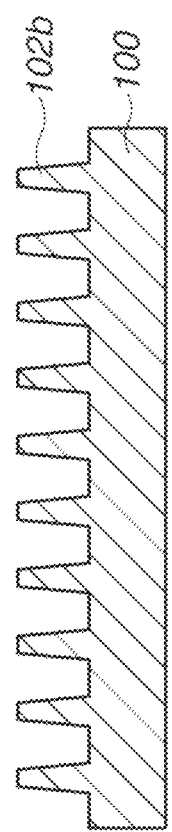

FIG. 3 is a sectional view showing an embodiment of shapes of the nanopillars, where FIG. 3A shows a cross-section of a cylindrical nanopillar 102a formed on the synthetic quartz glass substrate 100, and FIG. 3B shows a cross-section of a truncated cone-shaped nanopillar 102b formed on the synthetic quartz glass substrate 100. Specific shapes of the nanopillar include a prismatic shape, a cylindrical shape, an elliptic cylinder shape, a truncated pyramid shape, a truncated cone shape, a truncated elliptic cone shape, an inverted truncated pyramid shape, an inverted truncated cone shape and an inverted truncated elliptic cone shape. A plurality of types of shapes may be combined.

In particular, in the pillar pattern region, the indentation elastic modulus of the nanopillar measured with a spherical indenter by a nanoindentation method is 35 GPa or more, preferably 40 GPa or more, and 100 GPa or less, preferably 90 GPa or less, more preferably 80 GPa or less. If the indentation elastic modulus of the nanopillar is less than 35 GPa, chipping is likely to occur when the nanopillar is pressed to cause plastic deformation, and thus nanopillar chippings separated from the nanopillar may cause hindrance to individual authentication. On the other hand, if the indentation elastic modulus of the nanopillar is larger than 100 GPa, it may be difficult to press the nanopillar to cause plastic deformation.

The indentation elastic modulus $E_{IT}$ of the nanopillar can be derived from a contact depth $h_e$, a contact projected area $A_p$ and a contact stiffness S determined from a load-displacement curve obtained in a nanoindentation test, an elastic modulus $E_i$ of the indenter, a Poisson's ratio $v_i$ of the indenter and a Poisson's ratio $v_s$ of the sample. The indentation elastic modulus Err of the nanopillar is an elastic modulus in which in a combined elastic modulus $E_r$ involving the elastic modulus of the sample and the elastic modulus of the indenter, only the sample is considered. Specifically, the indentation elastic modulus Err can be calculated from the following formula (1).

$$E_{IT} = \frac{1 - v_s^2}{\frac{1}{E_r} - \frac{1 - v_i^2}{E_i}} \quad (1)$$

Here, the combined elastic modulus $E_r$ is given by the following equation (2) from the contact depth $h_c$, the contact projected area $A_p$ and the contact stiffness S determined from the load-displacement curve.

$$E_r = \frac{\sqrt{\pi}}{2} \frac{S}{\sqrt{A_p(h_c)}} \quad (2)$$

The height H of the nanopillar is preferably 20 nm or more, more preferably 30 nm or more, still more preferably 80 nm or more, and preferably 1,500 nm or less, more preferably 1,000 nm or less, still more preferably 500 nm or less. The width W of the nanopillar (particularly, the width of the top) is preferably 10 nm or more, more preferably 20 nm or more, still more preferably 40 nm or more, and preferably 500 nm or less, more preferably 300 nm or less, still more preferably 140 nm or less. For example, if the height of the nanopillar is less than 20 nm and the width of the nanopillar is less than 10 nm, it may be difficult to determine the degree of deformation after plastic deformation of the nanopillar using an electron microscope or the like. On the other hand, if the height of the nanopillar is more than 1,500 nm and the width of the nanopillar is more than 500 nm, the number of pillars in the pillar pattern region may be small, which is disadvantageous for individual authentication. The height of the nanopillar can be measured with an atomic force microscope or the like, and the width of the nanopillar can be measured with an atomic force microscope, a scanning electron microscope or the like.

The aspect ratio (ratio of height H to width (particularly top width) W (H/W)) of the nanopillar is preferably 0.5 or more, more preferably 1 or more, and preferably 6 or less, more preferably 5 or less. If the aspect ratio (H/W) is lower than 0.5, it may be difficult to determine the degree of deformation after plastic deformation of the nanopillar using an electron microscope or the like. On the other hand, if the aspect ratio (H/W) is higher than 6, chipping is likely to occur when the nanopillar is pressed to be plastically deformed, and thus nanopillar chippings separated from the nanopillar may cause hindrance to individual authentication.

In the structure for individual authentication according to the present invention, it is necessary that the nanopillar be plastically deformable. This is because in the structure for individual authentication according to the present invention, a change of the nanopillar before and after plastic deformation is utilized as an identification element in individual authentication. The nanopillar is usually plastically deformed by pressing the nanopillar in the height direction. This pressing can be performed by, for example, pressing a rigid body in contact with the nanopillars (pillar pattern region) and pressing the rigid body. By doing so, an external force can be applied to the nanopillar to cause plastic deformation.

The rigid body may be one having a Young's modulus equal to or greater than the Young's modulus of synthetic quartz glass forming nanopillars to be plastically deformed, and examples of the preferred material thereof include diamond and sapphire. The rigid body may have a contact surface having an area equal to or greater than the area of the top of the nanopillar, and examples of the preferred shape thereof include a spherical shape, a flat punch shape and a cube corner shape. If the area of the contact surface of the rigid body is smaller than the area of the top of the nanopillar, chipping is likely to occur in the nanopillar, and thus nanopillar chippings separated from the nanopillar may cause hindrance to individual authentication.

The pressing speed is preferably 500 mN/s or less, more preferably 100 mN/s or less with consideration given to variation in deformation form. In addition, the pressing load is preferably 0.005 mN or more, more preferably 0.05 mN or more, still more preferably 0.5 mN or more, and preferably 2,000 mN or less, more preferably 1,000 mN or less, still more preferably 500 mN or less, from the viewpoint of developing good identifiability in individual authentication. In plastic deformation of nanopillars, a dent reflecting the shape of the rigid body is formed as an arrangement of nanopillars in the pillar pattern region at a portion where the rigid body is pressed in contact with the nanopillars. For example, when the curved surface of the rigid body is pressed in contact with the nanopillars, a circular or elliptic dent can be observed on the upper surface image of the pillar pattern region in observation with an optical microscope or the like.

The shape of the pillar pattern region and the shape of a part of the pillar pattern region in which nanopillars plastically deformed with the spherical indenter by the nanoindentation method are present can be detected by an optical system with a bright field, a dark field or a differential interference in an optical microscope. The shape of a part of the pillar pattern region in which the plastically deformed pillar pattern exists reflects the shape of the spherical indenter, and therefore is a target of individual recognition. Specific shapes include a circular shape and an elliptic shape. There may be a plurality of dents made by the same spherical indenter, or there may be a plurality of dents made by different spherical indenter.

FIGS. 4A and 4B are sectional views showing an embodiment of shapes of nanopillars after plastic deformation of the nanopillars formed in the pillar pattern region of the synthetic quartz glass substrate, where FIG. 4A shows a cross-section of a barrel-shaped nanopillar 102c formed on the synthetic quartz glass substrate 100, and FIG. 4B shows a cross-section of a mushroom-shaped nanopillar 102d formed on the synthetic quartz glass substrate 100. The barrel-shaped nanopillar 102c shown in FIG. 4A can be obtained by, for example, pressing the cylindrical nanopillar 102a shown in FIG. 3A to cause plastic deformation. On the other hand, the mushroom-shaped nanopillar 102d shown in FIG. 4B can be obtained by, for example, pressing the truncated cone-shaped nanopillar 102b shown in FIG. 3B to cause plastic deformation.

Figure 5A:
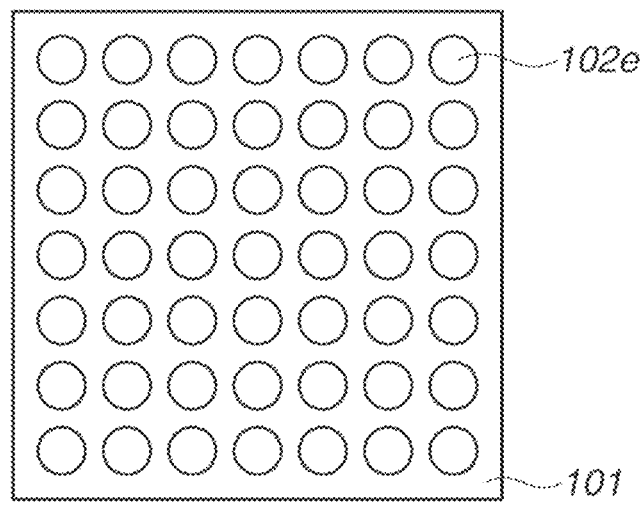
FIGS. 5A to 5C are plan views showing an embodiment of shapes of plastically deformed nanopillars, where
Figure 5B:
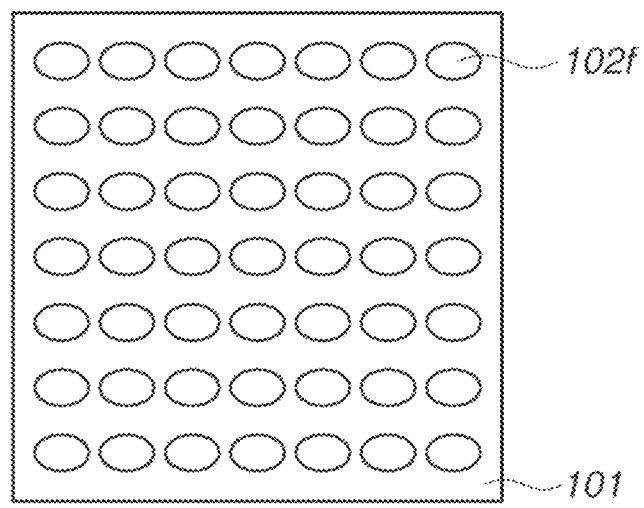
Figure 5C:
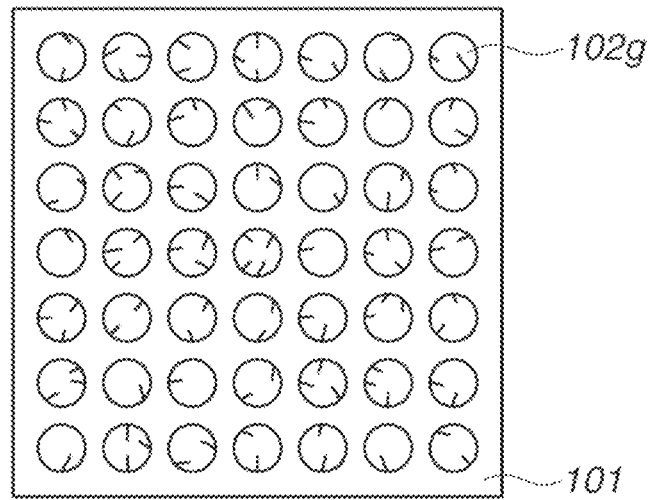

FIGS. 5A, 5B and 5C are plan views showing an embodiment of shapes of nanopillars after plastic deformation of the nanopillars formed in the pillar pattern region of the synthetic quartz glass substrate, where FIG. 5A shows a nanopillar 102e which is formed in the pillar pattern region 101 and has a circular shape in plan view, FIG. 5B shows a nanopillar 102f which is formed in the pillar pattern region 101 and has an elliptic shape in plan view, and FIG. 5C shows a nanopillar 102g which is formed in the pillar pattern region 101 and has a circular shape in plan view and which has cracks generated on the nanopillar surface during plastic deformation. The nanopillars 102e and 102g shown in FIGS.

5A and 5C, which have a circular shape in plan view, can be obtained by, for example, pressing the cylindrical nanopillars 102a shown in FIG. 3A and the truncated cone-shaped nanopillar 102b shown in FIG. 3B to cause plastic deformation in the arrangement of nanopillars shown in FIG. 2, and the nanopillar in plan view is circular and has an area larger than that before plastic deformation. On the other hand, a nanopillar 102f shown in FIG. 5B, which has an elliptic shape in plan view, can be obtained by, for example, pressing a nanopillar having an elliptic cylindrical shape, a truncated elliptic shape or an inverted truncated elliptic shape to cause plastic deformation, and the nanopillar in plan view is elliptic shape and has an area larger than that before plastic deformation.

While FIGS. 4 and 5 show a shape of nanopillars uniformly pressed by pressing with a rigid body, etc. to cause plastic deformation, the degree of plastic deformation of nanopillars does not have to be uniform in all the nanopillars. In addition, the shape after plastic deformation is not limited to those mentioned above, and may be a combination of two or more shapes.

By vertically pressing at least some of nanopillars which are formed in the pillar pattern region, e.g. nanopillars present at a specific position on the structure for individual authentication, to cause plastic deformation, and identifying the resulting pillar pattern including the deformed nanopillars, individual authentication with an artificial object can be performed. In the present invention, the type and degree of deformation of nanopillars play a role of grayscale, and the mode of the pillar pattern after deformation is substantially infinite, so that excellent individuality and clone resistance are developed.

Examples of the identification element in identification of the pillar pattern include the degree of deformation, the number of individuals within the recognition visual field, and the pillar periodicity. For the degree of deformation, specific discriminating factors include the shape, ellipticity, the pillar diameter distribution, the pillar height distribution and the number of cracks on the pillar surface within the deformed region. For the number of individuals within the recognition visual field, specific identification elements include the number of pillars and the distribution of the number of pillars within the deformed region. For the pillar periodicity, specific identification elements include the pillar position and the pillar position distribution within the deformed region.

The synthetic quartz glass substrate of the structure for individual authentication can be provided with a mark for alignment during individual authentication together with the pillar pattern region. When lithography as described later is used for forming nanopillars of the structure for individual authentication, the mark for alignment during individual authentication can be added in the process of forming the pillar pattern region.

The pillar pattern region including a plurality of nanopillars formed of synthetic quartz glass in the structure for individual authentication according to the present invention can be produced by a lithography method such as an electron beam lithography method, a photolithography method or a nanoimprint lithography method.

Specifically, for example, this method includes the steps of:
(1) forming an inorganic film on a surface of the synthetic quartz glass substrate on which a pillar pattern region is formed (first step);
(2) forming an organic film on the inorganic film (second step);
(3) patterning the organic film to form an organic film pattern on the inorganic film (third step);
(4) etching the inorganic film with the organic film pattern as an etching mask to form an inorganic film pattern (four step);
(5) etching a surface portion of the synthetic quartz glass substrate with the organic film pattern and inorganic film pattern or the inorganic film pattern as an etching mask to form the pillar pattern region (fifth step); and
(6) removing the organic film pattern and inorganic film pattern or the inorganic film pattern (sixth step).

In the first step, the inorganic film is usually formed over the entire surface of the synthetic quartz glass substrate on which the pillar pattern region is formed. Examples of the inorganic film include metal films and films of metal compounds such as metal nitrides, metal oxides, metal carbides, metal nitride oxides, metal nitride carbides, metal oxide carbides and metal nitride oxide carbides. The metal film may be a single film or an alloy film. In addition, the metal of the metal compound film may be only one metal or a combination of two or more metals. Specific examples of the metal include Ag, Al, Au, Cr, Cu, Mo, Ni, Ru, Si, Ta, Ti and W. Of these inorganic films, Cr films, Si films, Cr compound films and Si compound films are preferable from the viewpoint of ease of etching in the etching of the inorganic film in the fourth step. Specific examples of the Cr compound include CrN, CrO, CrNO and CrNOC (these formulae each represent the constituent elements of the compound and the ratio of each element is arbitrary), and specific examples of the Si compound include SiN (this formula represents the constituent elements of the compound and the ratio of each element is arbitrary). The thickness of the inorganic film is preferably 200 nm or less, more preferably 50 nm or less, and preferably 2 nm or more.

The inorganic film can be formed by a sputtering method. Specifically, with the use of a metal target, a metal compound target or the like as a target and a rare gas such as argon gas and a reactive gas such as an oxygen-containing gas, a nitrogen-containing gas or a carbon-containing gas if necessary as a sputtering gas, an inorganic film is formed on a synthetic quartz glass substrate with a sputtering apparatus. The power source may be either a DC power source or an AC power source, but when a DC power source is used, it is preferable to apply measures for suppressing arc generation.

In the second step, the organic film is formed on a part or the whole of the surface of the inorganic film. As the material for the organic film, a resist material sensitive to a desired activation energy ray such as an electron beam, an X-ray, an ultraviolet ray, an excimer laser (e.g. ArF or KrF) or a high-pressure mercury lamp (e.g. i-ray or g-ray) (photoresist material) is suitable. As the resist material, either a positive resist material or a negative resist material can be used, and a positive resist material is preferable from the viewpoint of accuracy and the environment. The thickness of the organic film can be selected from the range of 10 nm to several tens of μm, and a thin film is preferable from the viewpoint of resolution, and a thick film is preferable from the viewpoint of etching resistance. For both of the viewpoint of resolution and the viewpoint of etching resistance, the thickness is preferably about 0.5 to 5 μm in the case of employing wet etching for the etching of the surface portion of the synthetic quartz glass substrate in the fifth step, and preferable about 10 to 500 nm in the case of employing dry etching for the etching.

The organic film can be deposited by coating such as spin coating, spray coating, slit coating, screen printing or the like, and for performing coating more uniformly, spin coating is suitable. In spin coating, coating is performed at a maximum rotation speed of 2,000 to 4,000 rpm, and baking (prebaking) is performed after coating. The prebaking temperature depends on the type of organic film material, and is preferably in the range of about 80 to 120° C.

In the third step, the organic film is patterned to form an organic film pattern on the inorganic film. Examples of the method for forming the organic film pattern include methods by electron beam lithography or photolithography and methods by nanoimprint lithography.

In the method by electron beam lithography, an organic film formed on an inorganic film is drawn with an electron beam drawing apparatus, and a pattern drawn on the organic film is developed to form an organic film pattern. In the method by photolithography, an organic film formed on an inorganic film is exposed with the use of a photomask having a predetermined light-shielding portion and a non-light-shielding portion, and a pattern transferred to the organic film is developed to form an organic film pattern.

The solution to be used for development may be appropriately selected according to the type of resist material, and as a developing solution, for example, an alkali aqueous solution of tetramethylammonium hydroxide (TMAH) or the like, a xylene-based organic solvent, or the like can be preferably used. After development, rinse treatment with pure water or the like is performed to wash away the remaining developing solution and components derived from the resist material dissolved in the developing solution, and drying is performed to form an organic film pattern on the inorganic film. After drying, post-baking may be performed for strengthening the organic film. Preferably, post-baking is performed with a temperature and/or time which ensure that the organic film is no longer sensitive to light, and the temperature is higher than the pre-baking temperature before exposure (e.g. 130° C. or higher).

In the method by nanoimprint lithography, a concave-convex structure portion of an imprint mold having a predetermined concave-convex pattern is pressed against an organic film to fill the recesses of the mold with a resist material, the upper surface of the resist material is molded into a shape of the concave-convex pattern, and in this state, the organic film is cured, followed by separating the imprint mold from the cured organic film to form an organic film pattern.

The concave-convex structure portion of the imprint mold is pressed against the organic film preferably in a helium gas atmosphere or in an easily condensable gas atmosphere. The easily condensable gas atmosphere is an atmosphere of a gas that is easily liquefied by pressing when the gas is confined in mold voids, and in such an atmosphere, bubble defects are less likely to occur. Specific examples of such gases include 1,1,1,3,3-pentafluoropropane (PFP, HFC-245fa) and trans-1,3,3,3-tetrafluoropropene (TFP). If bubbles are generated between the surface of the concave-convex structure portion of the imprint mold and the resist material, pattern defects may occur in the organic film pattern, but in a helium atmosphere or an easily condensable gas atmosphere, helium gas or the easily condensable gas forming bubbles is dissolved in the resist material, so that occurrence of pattern defects can be prevented. As a method for curing the organic film, a method corresponding to the curing type of a material forming the organic film may be employed. For example, when the organic film material is a material of ultraviolet curable type, a method can be employed in which an organic film is irradiated with an ultraviolet ray through an imprint mold.

At a position on the organic film where the organic film contacts projections of the imprint mold after the imprint mold is separated from the cured organic film, the organic film usually remains with a proportionate thickness (e.g. 1 nm or more, particularly 5 nm or more and 20 nm or less, particularly 10 nm or less). It is preferable to remove this remaining portion before the synthetic quartz glass substrate is etched. The method for removing the remaining portion is not particularly limited, and examples thereof include ashing treatment with oxygen plasma, UV ozone treatment with ultraviolet light, and VUV treatment with vacuum ultraviolet light.

In the fourth step, the portion of the inorganic film which is exposed after removal of the organic film is selectively removed to form an inorganic film pattern (hard mask pattern). Etching is suitable for the selective removal of the inorganic film. The etching may be performed by either a wet process or a dry process, and in the case of the wet process, etching is performed by use of an etching solution corresponding to the type of the inorganic film. Specific examples of the wet process include wet etching using a Cr etching solution (ceric ammonium nitrate aqueous solution) when the inorganic film is Cr or a Cr compound. The concentration of the Cr etching solution is not particularly limited, and is preferably 5 to 20 wt %. On the other hand, in the case of the dry process, anisotropic etching is suitable. Specific examples of the dry process include argon ion milling and dry etching with a reactive gas such as $CF_4$, $C_3F_6$, $C_3F_8$, $C_4F_8$, $C_5F_8$ or $CHF_3$. After the selective removal of the inorganic film, the organic film pattern usually remains on the inorganic film pattern, and the fifth step may be carried out with the remaining organic film pattern left on the inorganic film pattern, or the fifth step may be carried out after removal of the remaining organic film pattern from the inorganic film pattern.

In the fifth step, a pillar pattern region (a plurality of nanopillars) is formed by etching the surface portion of the synthetic quartz glass substrate with the organic film pattern and the inorganic film pattern (hard mask pattern) as an etching mask when the organic film pattern is left, or with the inorganic film pattern (hard mask pattern) as an etching mask when the organic film pattern is removed after the inorganic film is selectively removed in the fourth step. In this etching, a pillar pattern region is formed where a portion which is not covered with the organic film pattern and the inorganic film pattern or which is not covered with the inorganic film pattern and has an exposed surface of the synthetic quartz glass substrate is etched (dug), and a portion covered with the pattern remains without being etched.

The method for etching the synthetic quartz glass substrate is not particularly limited, and examples thereof include wet etching in which the substrate is immersed in an etching aqueous solution containing fluoric acid and sodium fluoride; and dry etching with a reactive gas such as $CF_4$, $C_3F_6$, $C_3F_8$, $C_4F_8$, $C_5F_8$ or $CHF_3$.

In the sixth step, the organic film pattern and the inorganic film pattern are removed when the organic film pattern is left, and the inorganic film pattern is removed when the organic film pattern is removed after the inorganic film is selectively removed in the fourth step. The organic film pattern can be removed concurrently with removal of the inorganic film pattern, and the inorganic film pattern can be removed by etching. The etching may be performed by either a wet process or a dry process, and in the case of the wet process, etching is performed by use of an etching solution corresponding to the type of the inorganic film. Specific examples of the wet process include wet etching using a Cr etching solution (ceric ammonium nitrate aqueous solution) when the inorganic film is Cr or a Cr compound. The concentration of the Cr etching solution is not particularly limited, and is preferably 5 to 20 wt %. On the other hand, in the case of the dry process, anisotropic etching is suitable. Specific examples of the dry process include argon ion milling and dry etching with a reactive gas such as $CF_4$, $C_3F_6$, $C_3F_8$, $C_4F_8$, $C_5F_8$ or $CHF_3$.

The method for producing a structure for individual authentication has been described by taking as an example a method in which an inorganic film is first formed on the synthetic quartz glass substrate, and an organic film is then formed. The present invention is not limited to such an aspect. The structure for individual authentication can also be produced by so called a lift-off method in which an organic film is first formed on the synthetic quartz glass substrate, the organic film is patterned to form an organic film pattern, and an inorganic film is then formed.

Specific examples of the method include a method including the steps of:
(11) forming an organic film on the surface of a synthetic quartz glass substrate on which a pillar pattern region is formed (eleventh step);
(12) patterning the organic film to form an organic film pattern on the surface of the synthetic quartz glass substrate on which the pillar pattern region is formed (twelfth step);
(13) forming an inorganic film on the organic film pattern and the surface of the exposed synthetic quartz glass substrate (thirteenth step);
(14) removing the organic film pattern together with the inorganic film formed on the pattern of the organic film (fourteenth step);
(15) etching the surface portion of the synthetic quartz glass substrate with the inorganic film pattern, which is formed from the inorganic film formed on the surface of the synthetic quartz glass substrate, as an etching mask to form the pillar pattern region (fifteenth step); and
(16) removing the inorganic film pattern (sixteenth step).

In the eleventh step, the organic film is formed on a part or the whole of the surface of the synthetic quartz glass substrate on which the pillar pattern region is formed. As the material for the organic film, a resist material (photoresist material) sensitive to a desired activation energy ray such as an electron beam, an X-ray, an ultraviolet ray, an excimer laser (e.g. ArF or KrF) or a high-pressure mercury lamp (e.g. i-ray or g-ray) is suitable. As the resist material, either a positive resist material or a negative resist material can be used, and a positive resist material is preferable from the viewpoint of accuracy and the environment. The thickness of the organic film can be selected from the range of 10 nm to several tens of μm, and a thin film is preferable from the viewpoint of resolution, and it is necessary that the thickness of the organic film is sufficiently larger than that of the later-described inorganic film (e.g. at least twice the thickness of the inorganic film) from the viewpoint of removing the organic film pattern together with the inorganic film in the fourteenth step.

The organic film can be deposited by coating such as spin coating, spray coating or the like, and for performing coating more uniformly, spin coating is suitable. In spin coating, coating is performed at a maximum rotation speed of 2,000 to 4,000 rpm, and baking (prebaking) is performed after coating. The prebaking temperature depends on the type of organic film material, and is preferably in the range of about 80 to 120° C.

In the twelfth step, the organic film is patterned to form an organic film pattern on a surface of the synthetic quartz glass substrate on which the pillar pattern region is formed. Examples of the method for forming the organic film pattern include methods by electron beam lithography or photolithography and methods by nanoimprint lithography.

In the method by electron beam lithography, an organic film formed on a synthetic quartz glass substrate is drawn with an electron beam drawing apparatus, and a pattern drawn on the organic film is developed to form an organic film pattern. In the method by photolithography, an organic film formed on a synthetic quartz glass substrate is exposed with the use of a photomask having a predetermined light-shielding portion and a non-light-shielding portion, and a pattern transferred to the organic film is developed to form an organic film pattern.

The solution to be used for development may be appropriately selected according to the type of resist material, and as a developing solution, for example, an alkali aqueous solution of tetramethylammonium hydroxide (TMAH) or the like, a xylene-based organic solvent, or the like can be preferably used. After development, rinse treatment with pure water or the like is performed to wash away the remaining developing solution and components derived from the resist material dissolved in the developing solution, and drying is performed to form an organic film pattern on the synthetic quartz glass substrate. After drying, post-baking may be performed for strengthening the organic film. Preferably, post-baking is performed at a temperature higher than the pre-baking temperature before exposure (e.g. 130° C. or higher) because it is performed with a temperature and/or time which ensure that the organic film is no longer sensitive to light.

In the method by nanoimprint lithography, a concave-convex structure portion of an imprint mold having a predetermined concave-convex pattern is pressed against an organic film to fill the recesses of the mold with a resist material, the upper surface of the resist material is molded into a shape of the concave-convex pattern, and in this state, the organic film is cured, followed by separating the imprint mold from the cured organic film to form an organic film pattern.

The concave-convex structure portion of the imprint mold is pressed against the organic film preferably in a helium gas atmosphere or in an easily condensable gas atmosphere. The easily condensable gas atmosphere is an atmosphere of a gas that is easily liquefied by pressing when the gas is confined in mold voids, and in such an atmosphere, bubble defects are less likely to occur. Specific examples of such gases include 1,1,1,3,3-pentafluoropropane (PFP, HFC-245fa) and trans-1,3,3,3-tetrafluoropropene (TFP). If bubbles are generated between the surface of the concave-convex structure portion of the imprint mold and the resist material, pattern defects may occur in the organic film pattern, but in a helium atmosphere or an easily condensable gas atmosphere, helium gas or the easily condensable gas forming bubbles is dissolved in the resist material, so that occurrence of pattern defects can be prevented. As a method for curing the organic film, a method corresponding to the curing type of a material forming the organic film may be employed. For example, when the organic film material is a material of ultraviolet curable type, a method can be employed in which an organic film is irradiated with an ultraviolet ray through an imprint mold.

At a position on the organic film where the organic film contacts projections of the imprint mold after the imprint mold is separated from the cured organic film, the organic film usually remains with a proportionate thickness (e.g. 1 nm or more, particularly 5 nm or more and 20 nm or less, particularly 10 nm or less). It is preferable to remove this remaining portion before the synthetic quartz glass substrate is etched. The method for removing the remaining portion is not particularly limited, and examples thereof include ashing treatment with oxygen plasma, UV ozone treatment with ultraviolet light, and VUV treatment with vacuum ultraviolet light.

In the thirteenth step, the inorganic film is usually formed on the organic film pattern and the whole of the exposed surface of the synthetic quartz glass substrate. Examples of the inorganic film include metal films and films of metal compounds such as metal nitrides, metal oxides, metal carbides, metal nitride oxides, metal nitride carbides, metal oxide carbides and metal nitride oxide carbides. The metal film may be a single film or an alloy film. In addition, the metal of the metal compound film may be only one metal or a combination of two or more metals. Specific examples of the metal include Ag, Al, Au, Cr, Cu, Mo, Ni, Ru, Si, Ta, Ti and W. Of these inorganic films, Cr films, Si films, Cr compound films and Si compound films are preferable from the viewpoint of ease of etching in the etching of the inorganic film in the sixteenth step. Specific examples of the Cr compound include CrN, CrO, CrNO and CrNOC (these formulae each represent the constituent elements of the compound and the ratio of each element is arbitrary), and specific examples of the Si compound include SiN (this formula represents the constituent elements of the compound and the ratio of each element is arbitrary). The thickness of the inorganic film is preferably 200 nm or less, more preferably 50 nm or less, and preferably 10 nm or more.

The inorganic film can be formed by a sputtering method. Specifically, with the use of a metal target, a metal compound target or the like as a target and a rare gas such as argon gas and if necessary, a reactive gas such as an oxygen-containing gas, a nitrogen-containing gas or a carbon-containing gas, as a sputtering gas, an inorganic film is formed on a synthetic quartz glass substrate with a sputtering apparatus. The power source may be either a DC power source or an AC power source, but when a DC power source is used, it is preferable to apply measures for suppressing arc generation.

In the fourteenth step, the organic film pattern is removed together with the inorganic film formed on the organic film pattern, and when the organic film is formed so as to have a sufficiently larger thickness than that of the inorganic film, only a portion of the inorganic film, which is formed on the organic film pattern, is removed by removing the organic film pattern from a lateral portion of the organic film pattern, on which the inorganic film is not formed. In this case, the organic film pattern can be removed with an alkali aqueous solution of tetramethylammonium hydroxide (TMAH) or the like, a xylene-based organic solvent, or the like.

In the fifteenth step, a pillar pattern region (a plurality of nanopillars) is formed by etching the surface portion of the synthetic quartz glass substrate with the inorganic film pattern (hard mask pattern), which is formed from the inorganic film formed on the surface of the synthetic quartz glass substrate, as an etching mask. In this etching, a pillar pattern region is formed where a portion which is not covered with the inorganic film pattern and has an exposed surface of the synthetic quartz glass substrate is etched (dug), and a portion covered with the pattern remains without being etched.

The method for etching the synthetic quartz glass substrate is not particularly limited, and examples thereof include wet etching in which the substrate is immersed in an etching aqueous solution containing fluoric acid and sodium fluoride; and dry etching with a reactive gas such as $CF_4$, $C_3F_6$, $C_3F_8$, $C_4F_8$, $C_5F_8$ or $CHF_3$.

In the sixteenth step, the inorganic film pattern is removed. The inorganic film pattern can be removed by etching. The etching may be performed by either a wet process or a dry process, and in the case of the wet process, etching is performed by use of an etching solution corresponding to the type of the inorganic film. Specific examples of the wet process include wet etching using a Cr etching solution (ceric ammonium nitrate aqueous solution) when the inorganic film is Cr or a Cr compound). The concentration of the Cr etching solution is not particularly limited, and is preferably 5 to 20 wt %. On the other hand, in the case of the dry process, anisotropic etching is suitable. Specific examples of the dry process include argon ion milling and dry etching with a reactive gas such as $CF_4$, $C_3F_6$, $C_3F_8$, $C_4F_8$, $C_5F_8$ or $CHF_3$.

EXAMPLES

Examples and Comparative Examples are given below to more concretely illustrate the invention, although the invention is not limited by these Examples.

Example 1

First, an imprint mold to be used for nanoimprint lithography of an organic film was prepared. A 10 nm-thick CrN layer was formed on a 0.525 mm-thick square synthetic quartz glass substrate of 20 mm×20 mm by a sputtering method. Thereafter, a positive electron beam resist (ZEP520A manufactured by Zeon Corporation) was applied onto the CrN layer by spin coating, and prebaked at 180° C. for 10 minutes to form an 80 nm-thick positive electron beam resist layer. Thereafter, a charge-up inhibitor which is a conductive polymer (ESPACER 300Z manufactured by Showa Denko K.K.) was applied by spin coating to form a 10 nm-thick antistatic layer.

Next, a circular hole pattern having a diameter of 100 nm was drawn by use of an electron beam drawing apparatus (ELS-G125S manufactured by ELIONIX INC.). The antistatic layer was removed by washing with ultrapure water, and immersion treatment was performed with a developer (ZED-N50 manufactured by Zeon Corporation) and a rinse solution (ZMD-B manufactured by Zeon Corporation) in this order, followed by drying to form a resist-derived circular hole pattern having a diameter of 100 nm on the CrN layer.

Next, by use of an argon ion beam milling apparatus (20IBE-C manufactured by Hakuto Co., Ltd), a portion of the CrN layer at a hole-shaped resist opening where the surface of the CrN layer is exposed was selectively removed to form a CrN mask pattern as a hard mask. Thereafter, a surface portion of the synthetic quartz glass substrate which is not covered with the CrN mask pattern was etched with propane octafluoride ($C_3F_8$) gas by use of a dry etching apparatus (EIS-200ER manufactured by ELIONIX INC.), the substrate was immersed in a chromium etching solution (manufactured by Hayashi Pure Chemical Ind., Ltd.), and the CrN mask pattern was removed to obtain a synthetic quartz glass imprint mold having a circular hole pattern with a diameter of 100 nm. The release agent FAS13 ((tridecafluoro-1,1,2,2-tetrahydrooctyl)trimethoxysilane) was vapor-deposited on the obtained imprint mold.

Next, a CrN film (inorganic film) having a thickness of 10 nm was formed on a circular synthetic quartz glass substrate having a diameter of 100 mmφ and a thickness of 0.525 mm by a sputtering method. Thereafter, a photocurable resist was applied onto the CrN film to form an 80 nm-thick resist film (organic film). Next, by use of a nanoimprint apparatus (ImpFlex Essential manufactured by Sanmei Company), an imprint mold treated with a release agent was pressed against the resist film to mold the resist film, and in this state, the resist film was cured to form a resist film pattern (organic film pattern), which is a circular dot pattern with a diameter of 100 nm, on the CrN film. Thereafter, the resist film remaining on portions other than the dot pattern portion was removed with an oxygen-reactive etching apparatus (IM-TU01 manufactured by Tohoku University).

Next, by use of the argon ion beam milling apparatus (20IBE-C manufactured by Hakuto Co., Ltd), a portion of the CrN film other than the resist film pattern of the dot pattern where the surface of the CrN layer is exposed was selectively removed to form a CrN mask pattern (inorganic film pattern) as a hard mask. Thereafter, a surface portion of the synthetic quartz glass substrate which is not covered with the CrN mask pattern was etched with propane octafluoride ($C_3F_8$) gas by use of a dry etching apparatus (EIS-200ER manufactured by ELIONIX INC.), the substrate was immersed in a chromium etching solution (manufactured by Hayashi Pure Chemical Ind., Ltd.), and the CrN mask pattern was removed together with the resist film pattern to obtain a structure for individual authentication in which a pillar pattern region including cylindrical nanopillars formed of synthetic quartz glass is formed on the surface portion of the synthetic quartz glass substrate.

Figure 6:
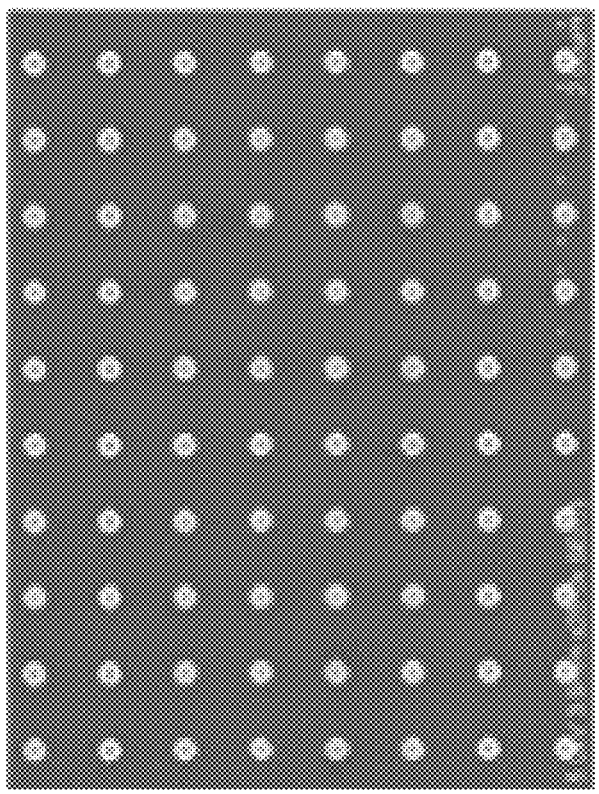
FIG. 6 shows a scanning electron microscope image of a pillar pattern region of a structure for individual authentication which is obtained in Example 1.

FIG. 6 shows a scanning electron microscope image of the pillar pattern region of the obtained structure for individual authentication. Here, the nanopillar has a height H of 100 nm, a width (diameter) W of 100 nm and an aspect ratio (H/W) of 1. The arrangement of nanopillars has a rectangular lattice-shaped regular period, and the arrangement period of the nanopillars is 500 nm. On the other hand, the indentation elastic modulus of the nanopillar in the pillar pattern region was 87 GPa as measured by a nanoindentation method.

Example 2

Figure 7:
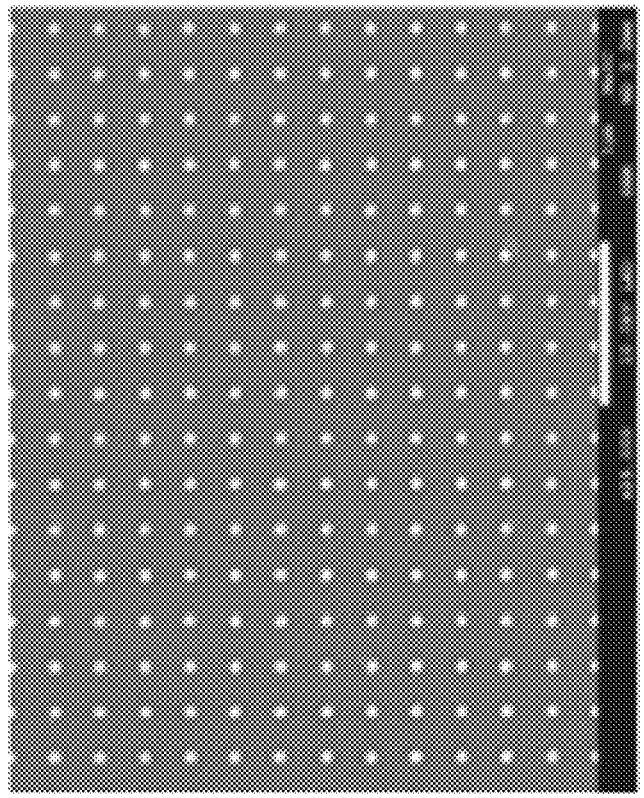
FIG. 7 shows a scanning electron microscope image of a pillar pattern region of a structure for individual authentication which is obtained in Example 2.

A structure for individual authentication was obtained by the same method as in Example 1 except that the diameter of the hole pattern formed in the imprint mold (the diameter of the dot pattern of the resist film pattern) was 50 nm. FIG. 7 shows a scanning electron microscope image of the pillar pattern region of the obtained structure for individual authentication. Here, the nanopillar has a height H of 200 nm, a width (diameter) W of 50 nm and an aspect ratio (H/W) of 4. The arrangement of nanopillars has a square lattice-shaped regular period, and the arrangement period of the nanopillars is 250 nm. On the other hand, the indentation elastic modulus of the nanopillar in the pillar pattern region was 44 GPa as measured by a nanoindentation method.

Example 3

A positive electron beam resist (ZEP520A manufactured by Zeon Corporation) was applied onto a 0.525 mm square synthetic quartz glass substrate of 20 mm×20 mm by spin coating, and prebaked at 180° C. for 10 minutes to form a 80 nm-thick positive electron beam resist film (organic film). Thereafter, a charge-up inhibitor which is a conductive polymer (ESPACER 300Z manufactured by Showa Denko K.K.) was applied by spin coating to form a 10 nm-thick antistatic layer.

Next, a circular hole pattern having a diameter of 50 nm and an L-shaped line pattern as an origin mark were drawn by use of an electron beam drawing apparatus (ELS-G125S manufactured by ELIONIX INC.). The antistatic layer was removed by washing with ultrapure water, and immersion treatment was performed with a developer (ZED-N50 manufactured by Zeon Corporation) and a rinse solution (ZMD-B manufactured by Zeon Corporation) in this order, followed by drying to form a resist film pattern (organic film pattern) which is a circular hole pattern having a diameter of 50 nm.

Next, a CrN film (inorganic film) having a thickness of 10 nm was formed on the resist film by a sputtering method. Thereafter, the substrate was immersed in toluene to remove the organic film pattern together with the inorganic film formed on the organic film pattern, and a CrN mask pattern (inorganic film pattern) was formed as a hard mask by a lift-off method. Thereafter, a surface portion of the synthetic quartz glass substrate which is not covered with the CrN mask pattern was etched with propane octafluoride ($C_3F_8$) gas by use of a dry etching apparatus (EIS-200ER manufactured by ELIONIX INC.), the substrate was immersed in a chromium etching solution (manufactured by Hayashi Pure Chemical Ind., Ltd.), and the CrN mask pattern was removed to obtain a structure for individual authentication in which a pillar pattern region including cylindrical nanopillars formed of synthetic quartz glass is formed on the surface portion of the synthetic quartz glass substrate.

Figure 8:
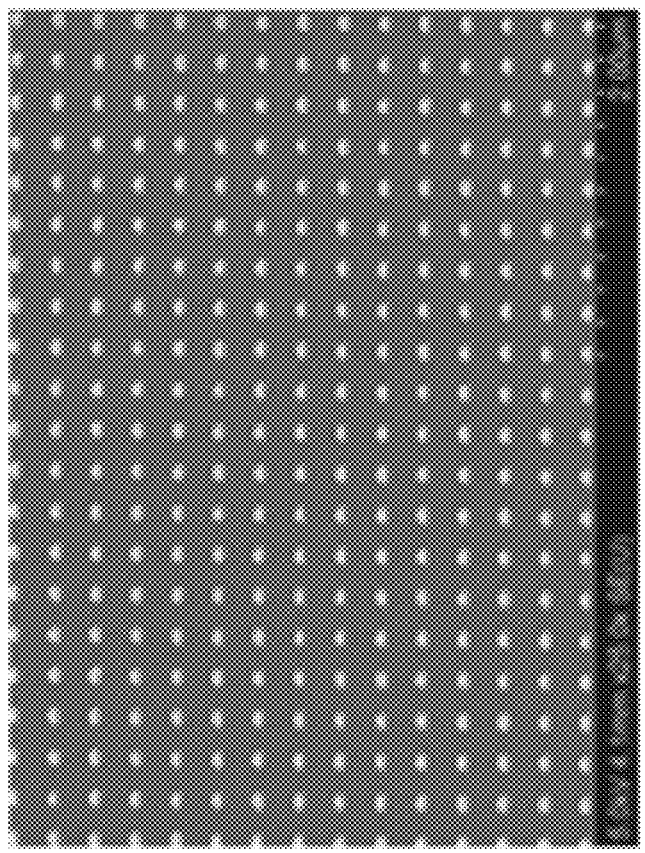
FIG. 8 shows a scanning electron microscope image of a pillar pattern region of a structure for individual authentication which is obtained in Example 3.

FIG. 8 shows a scanning electron microscope image of the pillar pattern region of the obtained structure for individual authentication. Here, the nanopillar has a height H of 100 nm, a width (diameter) W of 50 nm and an aspect ratio (H/W) of 2. The arrangement of nanopillars has a square lattice-shaped regular period, and the arrangement period of the nanopillars is 250 nm. On the other hand, the indentation elastic modulus of the nanopillar in the pillar pattern region was 62 GPa as measured by a nanoindentation method.

Example 4

Figure 9:
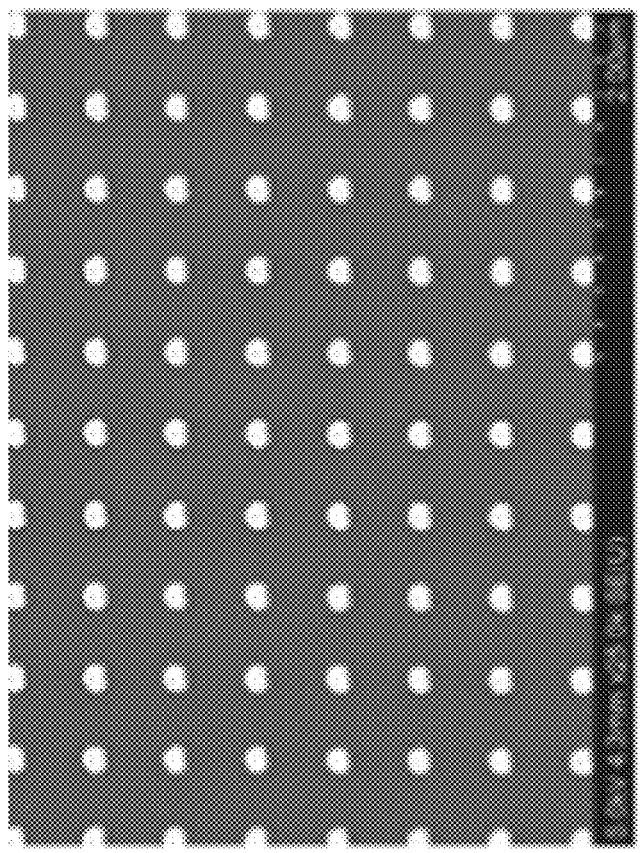
FIG. 9 shows a scanning electron microscope image of a pillar pattern region of a structure for individual authentication which is obtained in Example 4.

A structure for individual authentication was obtained by the same method as in Example 3 except that the diameter of the hole pattern of the resist film pattern was 100 nm. FIG. 9 shows a scanning electron microscope image of the pillar pattern region of the obtained structure for individual authentication. Here, the nanopillar has a height H of 300 nm, a width (diameter) W of 100 nm and an aspect ratio (H/W) of 3. The arrangement of nanopillars has a square lattice-shaped regular period, and the arrangement period of the nanopillars is 500 nm. On the other hand, the indentation elastic modulus of the nanopillar in the pillar pattern region was 47 GPa as measured by a nanoindentation method.

Experiment Example 1

By use of a nanoindentation testing machine (ENT-2100 manufactured by ELIONIX INC.) equipped with a diamond spherical indenter (manufactured by ELIONIX INC., curvature radius: 200 μm), the diamond spherical indenter (rigid body) was pressed in contact with the pillar pattern region of the structure for individual authentication prepared in Example 1, whereby some of nanopillars formed in the pillar pattern region were vertically pressed to cause plastic deformation. Specifically, the indenter was moved to the coordinates (30, 30) from the L-shaped origin mark at the coordinates (X, Y)=(0, 0), and pressed at a pressing speed of 5 mN/s and a load of 100 mN.

Figure 10A:
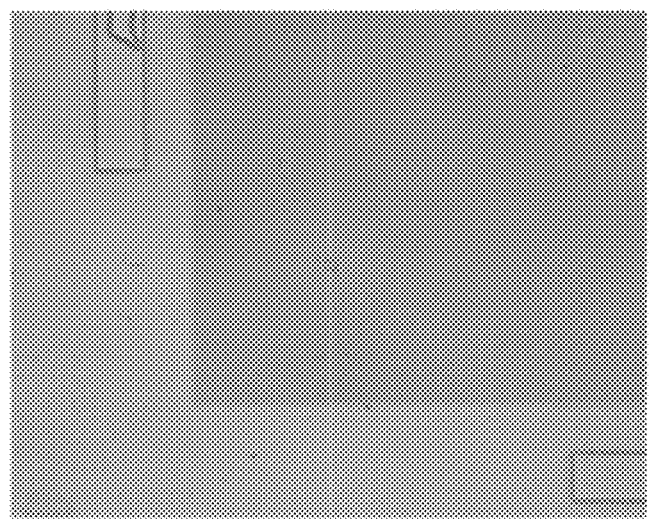
FIGS. 10A to 10C show optical microscope images of an upper surface of a nanopillar in a pillar pattern region in Experiment Example 1, where
Figure 10B:
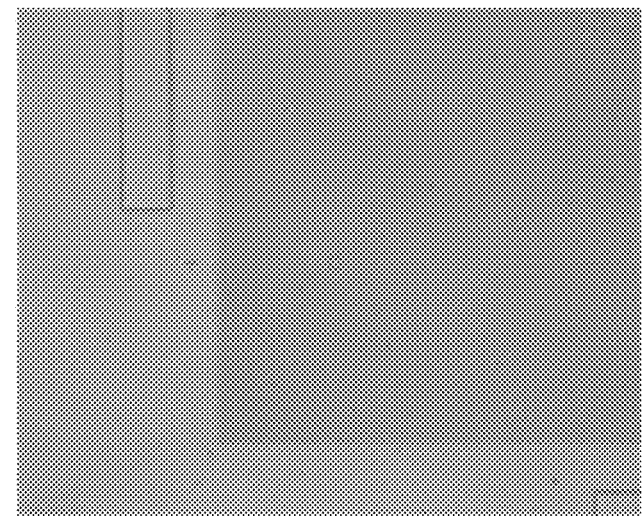
Figure 10C:
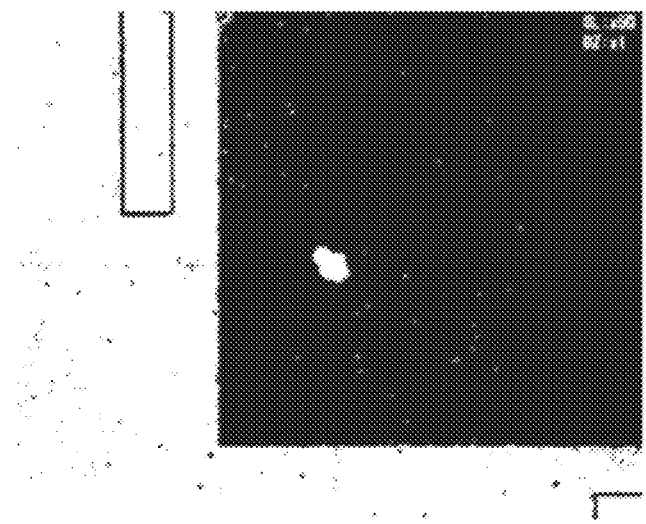

FIGS. 10A to 10C show optical microscope images of an upper surface of the a nanopillar in a pillar pattern region, where FIG. 10A shows the image before plastic deformation, FIG. 10B shows the image after plastic deformation, and FIG. 10C shows an image obtained by image conversion (binarization) of the image of FIG. 10B. It can be seen that on the upper surface image of the pillar pattern region, an elliptic dent reflecting the curved surface shape of the indenter is formed. In addition, in the image analysis with an image analysis tool, the dent was found to have a major axis length of 9 μm, a minor axis length of 6 μm and a circularity of 0.76.

Figure 11:
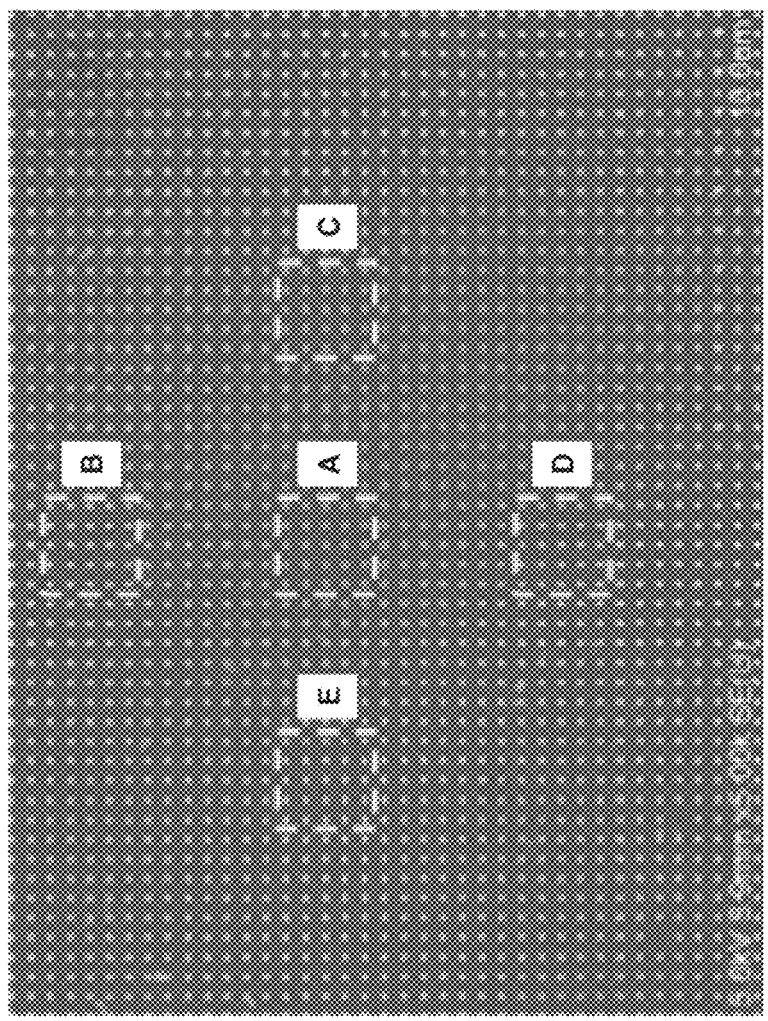
FIG. 11 shows a scanning electron microscope image of upper surfaces of portions of plastically deformed nanopillars in the pillar pattern regions of a structure for individual authentication in Experiment Example 1.

FIG. 11 shows a scanning electron microscope image of upper surfaces of portions of deformed nanopillars in the pillar pattern regions. The widths (diameters) of a total of 25 nanopillars, with 5 nanopillars in length and 5 nanopillars in width, were measured in each of regions A to E surrounded by the broken line. With respect to region A, regions B to E are located at positions such that the nanopillars located at the centers of the regions move by 12 nanopillars in the Y-axis positive direction, by 12 nanopillars in the X-axis positive direction, by 12 nanopillars in the Y-axis negative direction and by 12 nanopillars in the X-axis negative direction, respectively. The nanopillars in region A had a width (diameter) of 172 nm as a minimum value, 188 nm as a maximum value and 179 nm as an average value. The nanopillars in region B had a width (diameter) of 118 nm as a minimum value, 136 nm as a maximum value and 127 nm as an average value. The nanopillars in region C had a width (diameter) of 128 nm as a minimum value, 158 nm as a maximum value and 143 nm as an average value. The nanopillars in region D had a width (diameter) of 100 nm as a minimum value, 134 nm as a maximum value and 114 nm as an average value. The nanopillars in region E had a width (diameter) of 120 nm as a minimum value, 138 nm as a maximum value and 130 nm as an average value. It was found that in any of the nanopillars, the width (diameter) of the nanopillar, which was 100 nm before plastic deformation, increased after plastic deformation. In addition, it was found that there was a distribution in width (diameter) of the nanopillar among nanopillars within a region and among regions.

Figure 12B:
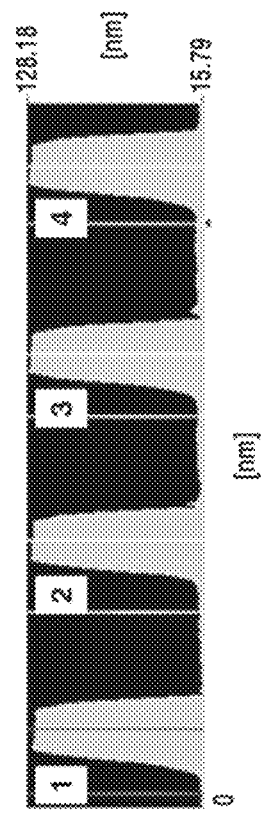
FIGS. 12A, 12B, 12C and 12D show atomic force microscope images of portions of plastically deformed nanopillars in the pillar pattern regions of the structure for individual authentication in Experiment Example 1, where
Figure 12A:
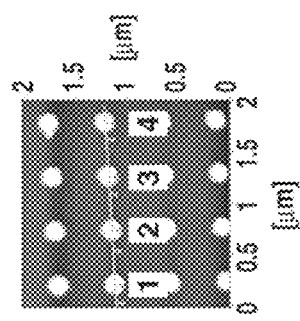
Figure 12D:
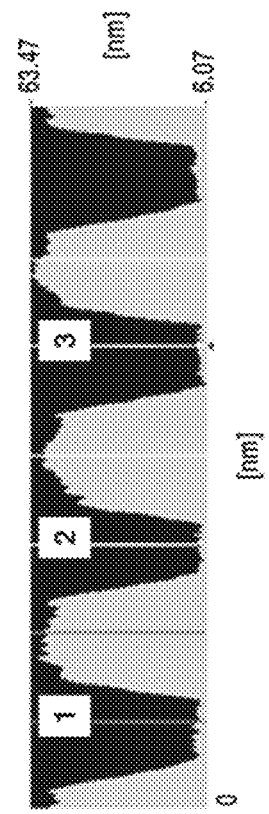
Figure 12C:
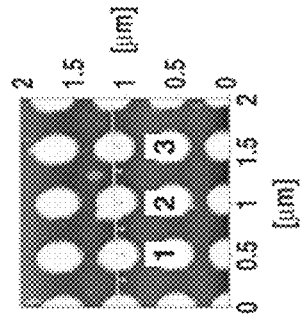

FIGS. 12A, 12B, 12C and 12D show atomic force microscope images of portions of nanopillars in the pillar pattern regions of the structure, where FIG. 12A shows a top image before plastic deformation, FIG. 12B shows a cross-section profile before plastic deformation, FIG. 12C shows a top image after plastic deformation, and FIG. 12D shows a cross-section profile after plastic deformation. The heights of four nanopillars (Nos. 1 to 4) before plastic deformation as shown in FIGS. 12A and 12B were 106.09 nm, 105.87 nm, 105.94 nm and 105.06 nm, respectively, and were substantially equivalent to a set height of 100 nm. On the other hand, the heights of three nanopillars (Nos. 1 to 3) after plastic deformation as shown in FIGS. 12C and 12D were 50.36 nm, 50.92 nm and 50.39 nm, respectively, and were found to decrease by about one-half after plastic deformation. In addition, it was found that there was a distribution in height of the nanopillar among nanopillars. A distribution can be observed in height of the nanopillar among nanopillars within a predetermined region and among regions as in the case of the above-described width (diameter) of the nanopillar.

Comparative Example 1

Figure 13:
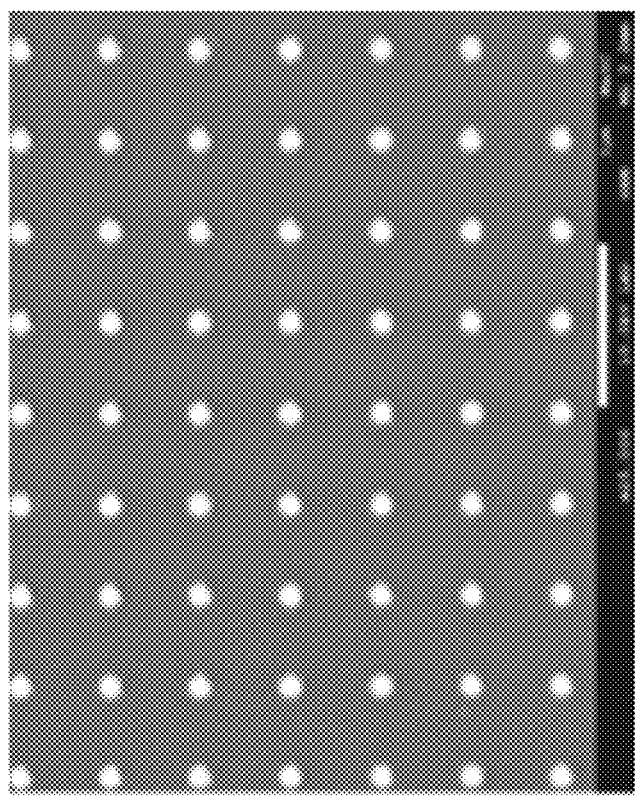
FIG. 13 shows a scanning electron microscope image of a pillar pattern region of a structure for individual authentication which is obtained in Comparative Example 1.

A structure for individual authentication was obtained by the same method as in Example 1 except that the time for dry etching of the synthetic quartz glass was doubled. FIG. 13 shows a scanning electron microscope image of the pillar pattern region of the obtained structure for individual authentication. Here, the nanopillar has a height H of 200 nm, a width (diameter) W of 100 nm and an aspect ratio (H/W) of 2. The arrangement of nanopillars has a square lattice-shaped regular period, and the arrangement period of the nanopillars is 500 nm. On the other hand, the indentation elastic modulus of the nanopillar in the pillar pattern region was 31 GPa as measured by a nanoindentation method.

Comparative Experiment Example 1

With the use of the structure for individual authentication prepared in Comparative Example 1, some of nanopillars formed in the pillar pattern region were vertically pressed to cause plastic deformation by the same method as in Example 1.

FIG. 14A shows a scanning electron microscope image of upper surfaces of portions of deformed nanopillars in the pillar pattern regions. It can be confirmed that the width (diameter) of the nanopillar, which was 100 nm before plastic deformation, increased after plastic deformation, and it is found that in some of nanopillars, chipping occur, and chippings are scattered. In addition, FIG. 14B shows an image obtained by converting (binarizing) the image of FIG. 14A for image analysis. In the image analysis with an image analysis tool, the number of nanopillars was calculated as 54 at a center part of the image where a total of 25 nanopillars, with 5 nanopillars in length and 5 nanopillars in width, were present, and it was not possible to measure the width (diameter) and the height of nanopillar and the distribution of the nanopillars.

Japanese Patent Application No. 2020-090993 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A structure for individual authentication in which a pillar pattern region including a plurality of nanopillars formed of synthetic quartz glass is formed on at least a part of a surface portion of a synthetic quartz glass substrate, wherein
in the pillar pattern region, the nanopillars have an indentation elastic modulus of 35 to 100 GPa as measured by a nanoindentation method, and
the nanopillars are plastically deformed.

2. The structure for individual authentication according to claim 1, wherein the nanopillars have a height H of 20 to 1,500 nm, a width W of 10 to 500 nm and an aspect ratio (H/W) of 0.5 to 6.

3. The structure for individual authentication according to claim 1, wherein the nanopillars formed in the pillar pattern region has a regular arrangement with the nanopillars arranged at regular interval.

4. The structure for individual authentication according to claim 3, wherein the regular arrangement has an orthorhombic lattice shape, a rectangular lattice shape, a face-centered rectangular lattice shape, a hexagonal lattice shape or a square lattice shape.

5. The structure for individual authentication according to claim 1, wherein a period in the nanopillars formed in the pillar pattern region is 1,500 nm or less.

6. The structure for individual authentication according to claim 1, wherein a period in the nanopillars formed in the pillar pattern region is 500 nm or less.

7. The structure for individual authentication according to claim 1, wherein a period in the nanopillars formed in the pillar pattern region is 20 nm or more.

8. A method for producing a structure for individual authentication in which a pillar pattern region including a plurality of nanopillars formed of synthetic quartz glass is formed on at least a part of a surface portion of a synthetic quartz glass substrate, wherein
in the pillar pattern region, the nanopillars have an indentation elastic modulus of 35 to 100 GPa as measured by a nanoindentation method, and
the nanopillars are plastically deformed, wherein
the method comprising the steps of:
forming an inorganic film on the surface of the synthetic quartz glass substrate, the surface being for forming the pillar pattern region;
forming an organic film on the inorganic film;
patterning the organic film to form an organic film pattern on the inorganic film;
etching the inorganic film with the organic film pattern as an etching mask to form an inorganic film pattern;
etching the surface portion of the synthetic quartz glass substrate with the organic film pattern and inorganic film pattern or the inorganic film pattern, as an etching mask, to form the pillar pattern region; and
removing the organic film pattern and inorganic film pattern or the inorganic film pattern.

9. The method according to claim 8, wherein in the step of patterning the organic film to form the organic film pattern, the organic film pattern is formed by electron beam lithography, photolithography or nanoimprint lithography.

10. A method for producing a structure for individual authentication in which a pillar pattern region including a plurality of nanopillars formed of synthetic quartz glass is formed on at least a part of a surface portion of a synthetic quartz glass substrate, wherein
in the pillar pattern region, the nanopillars have an indentation elastic modulus of 35 to 100 GPa as measured by a nanoindentation method, and
the nanopillars are plastically deformed, wherein
the method comprising the steps of:
forming an organic film on the surface of the synthetic quartz glass substrate, the surface being for forming the pillar pattern region;
patterning the organic film to form an organic film pattern on the surface of the synthetic quartz glass substrate;
forming an inorganic film on the organic film pattern and the exposed surface of the synthetic quartz glass substrate;
removing the organic film pattern together with the inorganic film formed on the organic film pattern;
etching the surface portion of the synthetic quartz glass substrate with the inorganic film pattern, as an etching mask, which is formed from the inorganic film formed on the surface of the synthetic quartz glass substrate, to form the pillar pattern region; and
removing the inorganic film pattern.

11. The method according to claim 10, wherein in the step of patterning the organic film to form the organic film pattern, the organic film pattern is formed by electron beam lithography, photolithography or nanoimprint lithography.

12. An individual authentication method comprising:
preparing a structure for individual authentication in which a pillar pattern region including a plurality of nanopillars formed of synthetic quartz glass is formed on at least a part of a surface portion of a synthetic quartz glass substrate, and
vertically pressing at least some of the nanopillars formed in the pillar pattern region of the structure for individual authentication to cause plastic deformation, and identifying a pillar pattern including the deformed nanopillars, wherein
in the pillar pattern region, the nanopillars have an indentation elastic modulus of 35 to 100 GPa as measured by a nanoindentation method.

13. The individual authentication method according to claim 12, wherein the nanopillars have a height H of 20 to 1,500 nm, a width W of 10 to 500 nm and an aspect ratio (H/W) of 0.5 to 6.

14. The individual authentication method according to claim 12, wherein the nanopillars formed in the pillar pattern region has a regular arrangement with the nanopillars arranged at regular interval.

15. The individual authentication method according to claim 14, wherein the regular arrangement has an orthorhombic lattice shape, a rectangular lattice shape, a face-centered rectangular lattice shape, a hexagonal lattice shape or a square lattice shape.

16. The individual authentication method according to claim 12, wherein a period in the nanopillars formed in the pillar pattern region is 1,500 nm or less.

17. The individual authentication method according to claim 12, wherein a period in the nanopillars formed in the pillar pattern region is 500 nm or less.

18. The individual authentication method according to claim 12, wherein a period in the nanopillars formed in the pillar pattern region is 20 nm or more.

* * * * *